United States Patent [19]

Parker

[11] Patent Number: 4,616,456
[45] Date of Patent: Oct. 14, 1986

[54] INSULATED WINDOW COVER APPARATUS

[76] Inventor: Gregory H. Parker, 6450 N. 78th St., #242, Scottsdale, Ariz. 85253

[21] Appl. No.: 689,861

[22] Filed: Jan. 9, 1985

Related U.S. Application Data

[63] Continuation of Ser. No. 488,261, Apr. 25, 1983, Pat. No. 4,513,548.

[51] Int. Cl.⁴ .............................................. E06B 3/26
[52] U.S. Cl. ..................................... 52/202; 296/216; 296/218
[58] Field of Search ................. 52/202; 296/216, 218, 296/211, 214

[56] References Cited

U.S. PATENT DOCUMENTS 4,272,934 6/1981 Cowden et al. ...................... 52/202
4,451,514 5/1984 Hunt ..................................... 296/211

Primary Examiner—Carl D. Friedman
Attorney, Agent, or Firm—Harry M. Weiss & Associates

[57] ABSTRACT

An insulated window insert or cover apparatus for use in motor vehicles having at least one window in the top or roof thereof which can be removed, tilted open, repositioned and the like to let in air. The insert apparatus includes a generally rectangular sheet of support material for blocking out the light from the sun which enters the roof window and insulation for absorbing the heat which enters the window to prevent the motor vehicle interior from becoming too hot and rendering the air conditioner inefficient and costly to run. The sheet and insulation are covered with a material whose interior-facing portion substantially matches the color, texture and fabric thereof for esthetic purposes. In particular cases, a resilient sheet of material may be used and the sheet may be eliminated and a relatively rigid sheet of plastic-foam material substituted in its place to serve a dual function. Insulation may be placed above or below the sheet or both and a fastener can be provided on the cover for removing the cover for cleaning purposes or for adding or removing insulation, as desired. Another embodiment, includes placing fastening means on the ceiling of the car and on the top of the window insert apparatus and removeably securing the apparatus from the inside of the car without leaving the vehicle, opening the window or the like.

6 Claims, 16 Drawing Figures

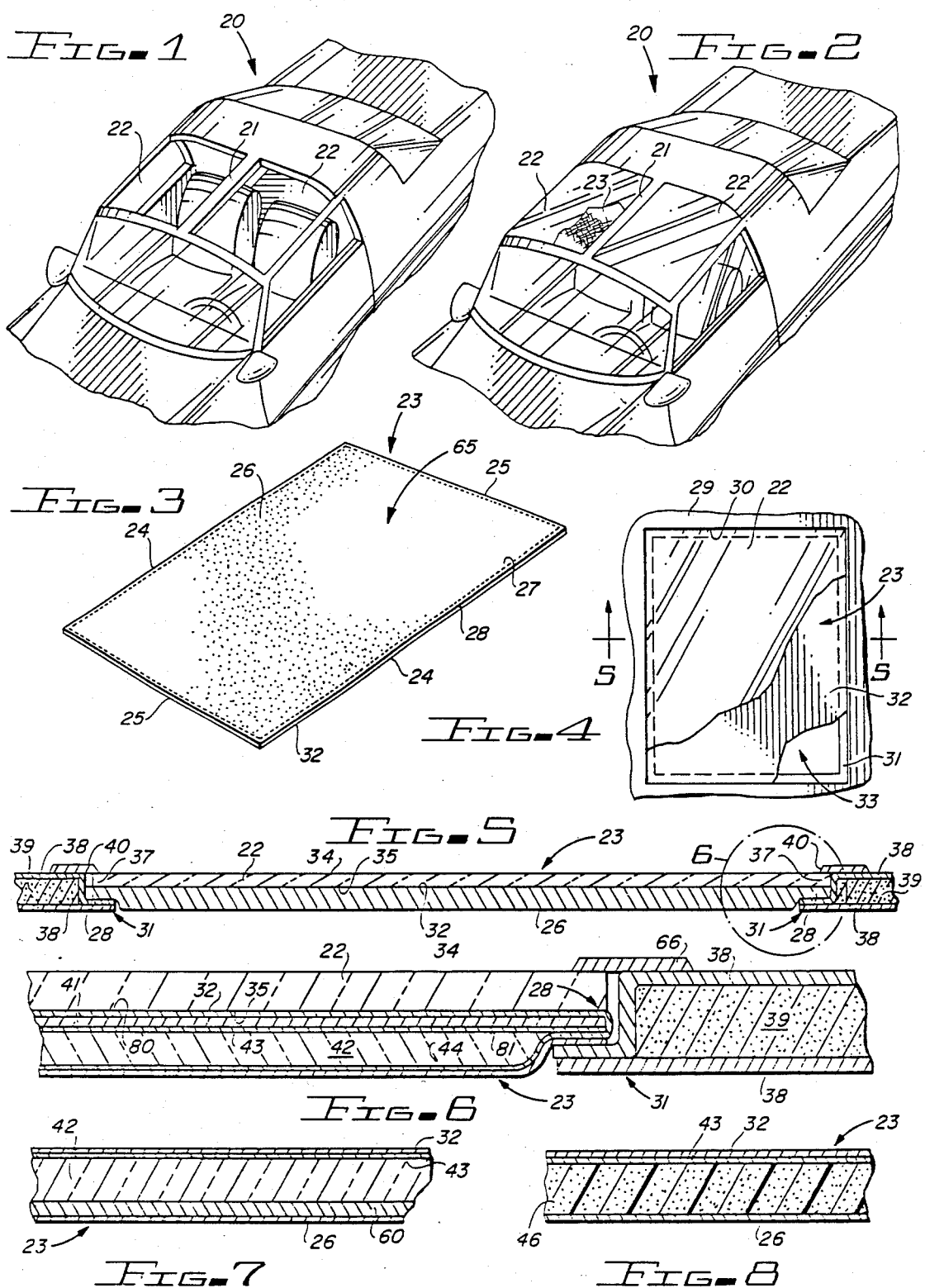

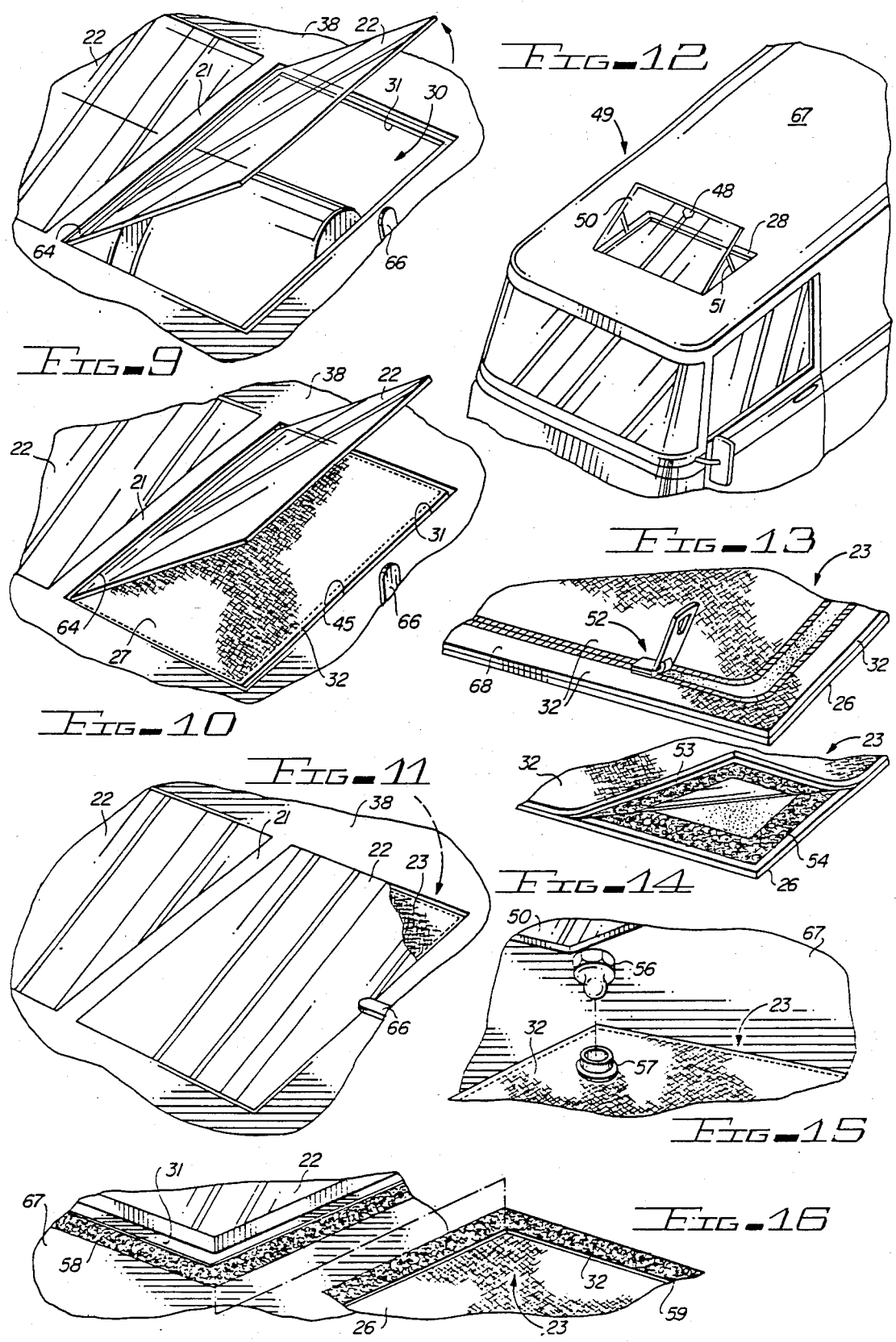

INSULATED WINDOW COVER APPARATUS

This is a continuation of U.S. patent application Ser. No. 488,261 filed Apr. 25, 1983, U.S. Pat. No. 4,513,548.

BACKGROUND OF THE INVENTION

1. Field of the Invention

This invention relates generally to a window cover apparatus for the top window in a motor vehicle and more particularly to a relatively thin pillow-like insulated window insert adapted to be removeably inserted in the top window opening of a motor vehicle and clampably retained therein by closing and locking the top window thereon.

2. Description of the Prior Art

Until the last decade, there were substantially no glass windows in the tops or roofs of automobiles, trucks, vans, buses and other motor vehicles, and therefore no problem with sunlight and heat entering the vehicle interior through the top window to render the interior or cabin uncomfortable, to cause a substantial decrease in the efficiency of the air conditioner, and a corresponding increase in the cost of fuel to operate the motor vehicle.

Once the top or roof windows were introduced, such as the T-top pair of top windows of the preferred embodiment of the present invention, and other top windows such as moon roofs, sun roofs, and the like, sunlight and heat became a major problem. When the windows are opened to admit air to the interior of the motor vehicle, there are no substantial problems, but when the windows are closed and locked, the sunlight impinging on the top window enters the interior of the motor vehicle and is often reflected off of internal surfaces to partially blind the operator of the vehicle. Furthermore, the heat entering the top glass window into the interior of the vehicle renders the interior or cabin somewhat uncomfortable, often to the point of causing a burning sensations about the operator's head, neck, shoulders, arms and the like or even causing lightheadedness or sunstroke.

If an air conditioner is used to combat this problem, the incoming heat will rapidly warm the cool air conditioned air making it uncomfortable and thereby lowering the efficiency of the air conditioner or requiring too great an increase in fuel consumption to warrant eliminating the problem in this manner. Besides, this does nothing about the sunlight and glare problem.

Another solution suggested in the prior art was the use of tinted glass for the top windows. However, this distracts from a major use or purpose of the top windows. If the occupants of the cabin want to look out at the sky, clouds, stars, and the like, they have only a restricted or limited view through the tinted top windows under non-sunny conditions. Besides, tinted glass does not effectively stop a substantial percentage of the incident sunlight during sunny conditions and there is little or no heat absorption so that substantially all of the solar heat passes through the top glass window and enters the interior of the motor vehicle to cause the problems itemized above.

Other attempts to provide a window blind shade or a sliding piece of painted cardboard which can be pulled out of a slot in the roof or ceiling materials to a position under the top window to block out some desired portion of sunlight, offer a partial, but totally inadequate solution to the present problems. These methods produce only some degree of shade within the interior of the vehicle, only slightly more than that provided by the tinted glass windows discussed above, and they leave the major problem the entry of solar heat into the vehicle interior, unaddressed.

Yet further, the use of such devices is unsightly, often requires modification to the vehicle interior, and generally produces a cheap look to top windows which were added at great expense to the owner of the motor vehicle. The pillow-like insulating window insert apparatus of the present invention solves substantially all of the problems and provides a relatively low cost, extremely simple means whereby a window insert apparatus can be removeably positioned and clamped immediately below the top window of a motor vehicle so as to block or reflect substantially all incident sunlight, to absorb incoming heat while preventing escape of the cool air conditioned air from the interior, and while presenting only interior material which matches the fabric, color and texture of the interior of the vehicle for esthetic purposes.

SUMMARY OF THE INVENTION

The present invention provides an insulated window insert apparatus for use in motor vehicles having at least one top window. It is contemplated that the top window is adapted to be removed, tilted open, re-positioned and the like to let air in and that the window rests upon a window frame ledge and flange extending inwardly toward the window opening from the window frame.

The insulated window insert apparatus includes a generally rectangular sheet of support material for blocking out sunlight and insulation disposed proximate at least one surface, preferably the lower surface, of the sheet of support material. A cover is provided for containing both the sheet of support material and the insulation and the cover is fastened around the peripheral edge of the sheet of support material for forming a cushioning lip for resting between the flange and the glass window when the window is closed and locked to clamp the insert in place.

The preferred embodiment of the present invention contemplates the sheet of support material as including a sheet of relatively rigid material such as wood, plastic, metal, cardboard, pressed paper and the like although a sheet of resilient material capable of flexing for insertion into the window ledge or slot prior to closing the window thereon for clamping purposes may also be used. The sheet of support material may include a reflective top surface for reflecting incoming heat and light and the insulation may include conventional fiberglass having outer layers of reflective foil.

Furthermore, alternate embodiments of the insulation means contemplate the insulation as being at least one sheet of insulation material while another embodiment contemplates a relatively loose fill type or bulk material. Yet further, the insulation may include a plurality of removeably stacked sheets of insulation material such as fiberglass, foam, fiber, plastic, foam rubber and the like. And lastly, the sheet support means may be eliminated and a relatively stiff or rigid piece of polyurethane foam insulation can be used to serve both purposes.

The alternate embodiments also contemplate the insulation disposed beneath the sheet of support material, on top of the sheet of support material, or on both sides of the sheet, as desired to meet the needs to a particular situation. The cover includes a top surface and a bottom surface and means for fastening the two surfaces together about their peripheries for securing the sheet means and insulation therein to form a relatively thin pillow-like structure. One of the covers, preferably the upper cover facing the window may include fastening means such as velcro strips, snaps, a zipper or the like for selectively opening the cover for removing the cover from the support sheet and insulation for cleaning purposes and the like and for selectively adding and removing sheets or quantities of bulk insulating material to increase and decrease the insulation characteristics of the system depending upon the degree of the heat problem at a particular time.

In yet another alternate embodiment, the interior ceiling or roof of the car is provided with a velcro strip or pads about the periphery of the window opening and the strip is preferably built into the interior fabric or suitably matched for esthetic purposes while a second velcro strip is secured above the periphery of the upper window-facing sheet of the window insert apparatus to enable simply picking up the apparatus and pressing the velcro strips together to almost instantaneously block out sunlight, provide heat absorption, increase the air conditioner efficiency, and not significantly detract from the esthetics of the vehicle interior.

While any type of fastening means may be used, a set of male and female snap fasteners could be aligned about the periphery of the window opening and the periphery of the upper surface of the insert apparatus for quick fastening and removal over the window opening as, could twist fasteners, and any similar fastening device known in the art.

Other advantages and meritorious features of the present invention will be more fully understood from the following description of the drawings and the preferred embodiment, the appended claims, and the drawings which are defined hereinbelow.

BRIEF DESCRIPTION OF THE DRAWINGS

FIG. 1 is a partial perspective view of a T-top automobile having a pair of top windows;

FIG. 2 is a partial perspective view of a T-top automobile having a pair of top windows including at least one window with the insulating insert apparatus of the present invention operatively disposed therein;

FIG. 3 is a perspective view of the insulated window insert apparatus or window cover of the present invention;

FIG. 4 is a top view of the left top window of the automobile of FIG. 2 partially broken away to show the various layers thereof;

FIG. 5 is a sectional view taken along lines 5—5 of FIG. 4;

FIG. 6 is a detailed view of that portion of FIG. 5 within the dashed circle labeled with reference numeral "6";

FIG. 7 is a cut-a-way partial side view of an alternate embodiment of the insulated window insertion apparatus of FIG. 3;

FIG. 8 is a partial side view of an alternate embodiment of the insulated window insertion apparatus of FIG. 3;

FIG. 9 is a partial perspective view showing a top window of the vehicle of FIG. 1 in the open position;

FIG. 10 is a partial perspective view of the open window of FIG. 9 with the insulated insert apparatus of the present invention positioned therein;

FIG. 11 is a partial perspective view of the window and insert apparatus of FIG. 10 with the window closed and locked;

FIG. 12 is a partial perspective view of a van having a tiltable sun roof;

FIG. 13 is a detailed view of an alternate embodiment of the cover of FIG. 3 including a zipper;

FIG. 14 is a partial perspective view of an alternate embodiment to the cover of FIG. 3 using velcro strips to open and close the cover;

FIG. 15 is an alternate embodiment of the clamping apparatus wherein male snaps are disposed about the periphery of the inside window opening and female snap members are positioned above the periphery of the top of the insulated insert apparatus or vice versa for quickly attaching and removing the insert apparatus from inside the vehicle without unlocking or opening the top window; and FIG. 16 shows a partial perspective broken away view illustrating another alternate embodiment wherein the insert apparatus is removeably secured about the inside of the window opening by velcro strips set in the roof or ceiling of the vehicle interior.

DESCRIPTION OF THE PREFERRED EMBODIMENT

FIG. 1 shows a relatively expensive T-top automobile 20 including a centrally disposed T-bar 21 and a pair of generally rectangular top T-bar glass windows. The glass windows are clampably attached or secured within window openings, as hereinafter described, so as to seal the interior of the motor vehicle 20 during normal conditions. However, the top windows 22 can be tilted up or removed while other types top windows can slide back into the roof or be re-positioned to permit air into the interior of the automobile 20, if desired.

FIG. 2 shows the automobile 20, the T-bar 21 and the pair of top T-bar windows 23 with a portion of the T-bar window on the passenger side cut away to show the insulated insert apparatus or window cover 23 of the present invention removeably secured in its position under the window 22. As hereinafter described, the peripheral edges of the insert apparatus 23 are disposed upon interior flanges extending into the window opening and when the window 22 is closed, it clamps the insulation insert apparatus 23 into position between the glass window and the ledge.

FIG. 3 shows the insulation pad or window cover 23 as having a generally rectangular shape including a pair of longitudinal edges 24 and a pair of side edges 25 wherein the side edges 25 are substantially parallel, the longitudinal edges 24 are substantially parallel, and the side edges 25 are substantially perpendicular to the longitudinal edges 24, as known in the art. The insulation insert apparatus 23 further includes a cover 65 including a bottom or interior side cover fabric or material 26, a top fabric cover surface 32, stitches 27 for securing the top cover surface 32 to the bottom cover surface 26 proximate to, through, or via the peripheral edges of the sheet of relatively stiff support material, as hereinafter described. The stitches 27 and the upper cover fabric 32 and lower cover fabric 26 form a lip portion, bead, or ledge-engaging portion 28 adjacent to periphery of the insert apparatus 23.

FIG. 4 shows a portion of a motor vehicle roof 29, a window frame 30 and a positioning ledge or interior window flange 31 upon which the peripheral edge 28 of the insert apparatus rests for clamping when the glass window 22 is closed and locked thereon. Reference numeral 33 designates, in general, the actual window opening to the interior or cabin portion of the motor vehicle 20.

FIG. 5 shows the insulating insert apparatus 23 having a bottom or interior cover portion 26 which extends into the motor vehicle and, in the preferred embodiment of the present invention, includes fabric which matches the interior of the motor vehicle in color, texture and material for esthetic purposes. The insert apparatus 23 also includes a top cover surface 32, and the top cover surface 32 and bottom cover surface 26 are secured together by fastening means, not shown but not in the art, to form a peripheral lip or ledge-engaging portion 28 of the insert apparatus 23. The automobile body includes a metal portion of the roof 38 and roof insulation 39 which are pressed together in the window opening to form the window ledge or flange 31 upon which the lip portion 28 of the insulation insert apparatus 23 is operatively disposed. The top window glass 22 of the motor vehicle includes a top surface 34, a lower surface 35, and end portions 37 adapted to the operatively disposed directly upon the lip portions 28 above the flanges 31. The interior surface or inside surface 35 of the window glass 22 is disposed proximate the exterior top surface cover 32 while the lower surface of insert apparatus 23 is provided with the interior-matching material cover 26, as previously described. Furthermore, once the window 22 has been closed upon the insulated insert apparatus 23, a clamping mechanism 30 which may be, for example, any type of hold down mechanism, hinge, clamp or the like, known in the art, and particularly those presently used to lock the window 22 in place, will positionally retain the insert pillow apparatus 23 beneath the window 22 until the window is repositioned or the like to remove the insert apparatus 23.

FIG. 5 can be used to broadly illustrate the concept of the present invention. When the sunlight or rays of the sun impinge on the outer surface 34 of the tinted safety glass windows 22, most of the sunlight and substantially all of the heat passes through the window 22 to the insulated insert apparatus 23. As the heat and light leave the lower surface 35 of window 22 and impinge upon the upper or outwardly facing cover 32 of the insert 23, some of the light and heat may be reflected and absorbed, respectively, depending upon the type of material used, and by the support member immediately thereunder which will stop substantially all of the light and at least some of the heat. The remaining heat perhaps the majority of it, is absorbed by the insulation material 42 so that virtually none escapes through the bottom interior matching fabric 26 to render the interior of the vehicle uncomfortable or the like.

FIG. 6 is an exploded detailed view of that portion of FIG. 5 shown within the circle labelled reference 6. A portion of the car top metal 38 is shown with the conventional roof insulation 39. The top and bottom portions 38 of the roof material are extended down into the window opening and pressed together extend into the window opening to form a flange or window-receiving ledge 31 about the periphery thereof so that the glass window 22 can rest on the ledge 31 and be operatively clamped therein during normal window closed operations. The relatively thin pillow-like insertion assembly 23 is shown as including an upper cloth layer 32 and a lower cloth layer portion 26. Sandwiched inbetween the cloth portions 32 and 26 are a relatively rigid support sheet 41 whose upper surface 80 is operatively disposed against the material of the upper cover 32 and its lower surface 81 is operatively disposed upon the upper silver foil or aluminum foil layer 43 surrounding the insulation material 42 which, in the preferred embodiment, may be fiberglass. The fiberglass is contained at the bottom by a second sheet of aluminum foil 44 or the like which rests on the inwardly extending lower cloth surface 26 which matches, at least the exterior, the color texture, and fiber fabric of the vehicle interior for esthetic purposes. Any sunlight impinging on the surface 34 of the window 22 will be substantially passes by the outer cloth material 32 and the sunlight will be stopped by the relatively stiff opague support member 41. Any sunlight which could pass, would be reflected by the outer layer of silver foil 33. The heat passing through the support material 41 is partially reflected by the foil layer 23 and the remaining heat is absorbed by the fiberglass or similar insulation material 42 contained between the foil or reflecting sheets 43, 44. If any heat does try to excape, the foil 44 can direct it back into the insulation material 42, as known in the art. It will be noted that the lip 28 which is adapted to rest upon the ledge 31 to be clampably secured therein by the glass 22 and the clamping member 66 may be formed by wrapping the upper layer of the cover material 32 and the lower layer of cover material 26 around the end of the substantially rigid support sheet with the insulation being disposed slightly inward thereof thereby forming the lip 28 upon which the window edge 37 rests and is clamped thereon by window clamping member 56.

FIG. 6 shows an alternate embodiment of the present invention wherein the insert apparatus 23 includes a top cover of cloth-like material or the like 32, a bottom layer of cloth-like material or the like 26 and a sandwich of layers comprising foil 43 adjacent to the bottom of the top cover 32, insulation material 42 proximate the bottom of the foil layer 43, a generally rectangular sheet of substantially resilient material such as plastic, fiberglass, other thin materials capable of bending or the like 60. The resilient material 60 can be flexed or bent to be fitted into the window opening or window slots and wedged therein till one end is fitted in and then released to snap back into the remainder of the slot for removeably positioning the same.

FIG. 8 shows another embodiment wherein no sheet of substantially rigid material 41 is used but instead, a relatively stiff or rigid sheet of polyurethine foam material or any rigid or semi-rigid insulation means 46 has a foil layer 43 positioned thereover and an upper layer 32 and lower layer 26 of cover material for completing the insert apparatus 23. The sheet of aluminum foil 43 can, be positioned adjacent the lower cloth layer 26 rather than the upper cloth layer 32; can be operatively disposed on both sides of the sheet of polyurethane material; or can be eliminated entirely, depending upon a particular heat insulation characteristics of the area and the degree of insulation desired by the operator. Furthermore, the relative thickness of the pillow-like insert member 23 may be varied from relatively thin by eliminating substantially all of the insulation 42 to very thick by increasing the amount of insulation 42 or even by varying the thickness of the sheet of relatively stiff material 41, as might be done in different areas of the country.

FIGS. 9, 10 and 11 show the insulation of the insert apparatus 23 of the present invention. In FIG. 9, the window 22 is unlatched by latch 66 and tilted upward or opened to slide back in window slot 64 a short distance. This exposes substantially all of the ledge or flange portion 31 and, as shown in FIG. 10, enables the window cover or insert apparatus 23 to be slid into the window opening 30 and positioned so that the peripheral lip portion 35 is operatively disposed upon the flange 31 to prevent the insert apparatus 23 from falling through the window opening into the interior of the vehicle when flexible sheets are used and from blowing away out the top while the window 22 is left open. FIG. 10 shows the window 22 closed over the insert apparatus 23 and the latch 66 closed or locked to clampably secure the insert apparatus 23 between the inner window flange 31 and the edge 37 of the closed window 22. This disposes the upper surface 32 of the cover proximate to the lower side 35 of the window 22 while the bottom portion of the cover 26 which, as previously described, substantially matches the interior of the vehicle is disposed through the window aperture to protrude slightly into the interior of the vehicle extending to slightly below the level of the interior roof without any loss of esthetic appeal.

FIG. 12 shows the use of an insulated insert apparatus with other types of roof windows. For example, van 49 has its roof 67 provided with a window opening and a tiltable window 50, such as a sun roof, a moon roof or the like is positioned therein so that it can be tiltably raised and lowered. When raised, the window can be locked open to allow air into the interior of the van 49 via the window locking brace 51 and closed upon the window flange or ledge portion 28 and lockably clamped thereon by latch 48 for keeping the window closed, as desired. Generally, sun roofs and moon roofs and the like are substantially more rectangular than the two T-top windows 22 of FIGS. 1 and 2 and extends substantially across the vehicle. While the T-top windows 22 are positioned substantially directly above the front driver's seat and the front passenger's seat, the moon roof or sun roof may be positioned over the front seat, or slightly rearward thereof. Furthermore, the sunroof and moonroof are generally longer and narrower but the size and shape of the roof top window 50 does not matter since the insertion apparatus of the present invention can be used with any size or shape or construction of roof top window, eventhough minor alterations may be needed where no window ledge 31 is present.

FIG. 13 illustrates a pillow-case type cover comprising the upper or outer layer 32 and the inwardly facing bottom layer 26. In FIG. 13, a zipper device 52 is operatively disposed about at least one side of the insert apparatus 23 and is disposed inwardly of the peripheral edge portion of the cover 68. The zipper 53 can be opened to remove the insulation material 42 and the stiffener 41 so that the cover 32, 26 can be washed or the like. Furthermore, the zipper 52 may be opened to allow the insulation to be increased by adding sheets of insulation material or even bulk insulation for that matter and for decreasing the insulation by removing sheets of insulation material or bulk insulation. Furthermore, the zipper apparatus 52 could be disposed on the lower interior surface 26 but is preferably disposed on the window-facing surface so as to be invisible to passengers in the vehicle 49.

FIG. 14 shows another embodiment of the selectively removeable cover of the present invention. In FIG. 14, the upper cover sheet of fabric or the like 32 has a strip or upper pad of interior-facing VELCRO material, either hooks or loops and the lower or interior cover layer 26 has a similarly disposed strip or pad of window-facing VELCRO material, for example the other of loops or hooks so that when the two layers 26, 32 are pressed together, the quick/detach fastener strips 53 and 54 may be pressed together for fastenably securing the cover 26, 32 shut for containing the insulation 42 and rigid sheet 46 therein. Since the VELCRO strips of hooks and loops or male and female pads are contained within the insert apparatus 23, nothing shows on the interior of the vehicle 67 to spoil the appearnces thereof.

In some cases, a vehicle 49 with a top window 50 will not have a ledge or flange 31 sufficient to hold both the window 50 and the insert device 23 of the present invention. Further, sometimes the clamping means or latch 48, 56 will not close when the insert pad 23 is inserted into the window opening. In other cases, the operator may not want to release the window latch, climb out of the vehicle, raise, remove or otherwise reposition the window 50, install the insulation pad 23, and then close and latch the window 22 to complete the operation.

Alternatively, therefore, FIG. 15 shows an embodiment wherein the interior surface of the van roof 67 is provided with a plurality of one male or female snap members 56, 57 positioned at a predetermined locations about the periphery of the window opening 33 and the insulated insert pads 23 of the present invention are provided with the other of corresponding male or female snap members 57, 56 such that the pad 23 can be detachably secured to the interior roof of the van 49 by inserting male snap members 56 into the female snap sockets 57, as conventionally known, until the pad 23 is snap-fastened completely around its periphery so that substantially no sunlight can enter the window 50 and any heat which enters is absorbed by the insulation material 42 within the pad 23, as previously described. Furthermore, any suitable removeable fastening device such as 90° twist fasteners, zippers, hook and eye, buttons, laces and the like can be used so long as they do not detract substantially from the interior appearance of the vehicle. However, the snap members 56, 57 and most other simple fasteners would not be visible to those inside the van 49 since the pad 23 would cover the snaps 56, 57 and present only the attractive lower surface 26 which substantially matches the vehicle interior to those inside said vehicle 49.

FIG. 16, is another embodiment of the concept of FIG. 15 wherein the insulated insert apparatus 23 is shown disposed beneath the window 22 or 50 which is resting on the flange 31. Immediately beneath the window opening 30 pads or strips of interior-facing VELCRO fasteners 58 are secured to the inside roof around the opening or to the area about the ledge within the opening with the hooks or loops facing the vehicle interior. A second pad or strip of VELCRO material 59 is operatively secured to the window-facing cover portion 32 such that the corresponding loops or hohoks are facing the roof and when the two VELCRO layers 58, 59 are pressed together, the hook portions and loop portions attach so as to detachably secure the window insert over the lower end of the window opening or disposed therein. The opposite strips 58, 59 can be torn apart to detach the window covering 23 for later use. As use herein, VELCRO will also be referred to as tear strips, hook and loop fastening means and quick attach-detach means. The tear strips 58 secured to the roof would preferably be substantially hidden or blended on to the interior roof fabric.

As previously mentioned, the sheet of relatively stiff or rigid material for the stiffener 41 may be made of any suitable material such as plywood, plastic, metal, cardboard, pressed paper, various types of wood, and the like, as substantially known in the art, given the use to which applicant is putting said stiffener. Furthermore, in alternate applications where a relatively resilient or flexible sheet of material is required, any suitable type of material such as plastic, plywood, metal, and other materials known in the art can be used which will supply sufficient support for the insulated insert apparatus 23 for the present invention while allowing it to flex or easily fit into the window opening and into the window slot or onto the ledge or flange 31. The insulation, may be any conventional type of insulation such as fiberglass, fiberglass sheets with aluminum foil or its equivalent on one or both sides of thereof, bulk insulation material of any kind, various plastic foams, foam rubber, and any conventional insulation material which can absorb heat and prevent the escape of cool air from the interior of the vehicle. While various fasteners have been mentioned, it will be obvious that in addition to stitches, snaps, VELCRO strips, and zippers, that any other types of conventional fastening means could be used as well as including snap fasteners, rivets, staples, epoxy or other glue-like material, heat seals, and the like, as conventionally known.

Furthermore, the nature of the latching means or clamping means used to close the window is conventional depending on the make and model of motor vehicle to be fitted, and applicant's description thereof is merely illustrative of fastening devices admittedly existing in the prior art for other uses. And lastly, applicant's use of a substantially rigid insulation material 42 such as polyurethine foam or the like is meant to include any type of substantially rigid foam, plastic insulation, foam rubber, or the like which provides the necessary insulation while also providing enough support to allow elimination of the sheet 41 support material.

From this detailed description of the specific apparatus used to illustrate the preferred embodiment of the present invention and the operation thereof, it will be obvious to those skilled in the art that various modifications can be made without departing from the spirit and scope of the present invention which is limited only by the appended claims:

I claim:

1. An insulated window insert apparatus for use in a motor vehicle having at least one window in the top thereof, said at least one window including a window pane and a window pane holder, comprising:

a generally rectangular sheet of support material for blocking out light from the sun;

insulation means operably disposed proximate said sheet of support material for insulating an interior of said motor vehicle from external temperature conditions; and means for covering said generally rectangular sheet of support material and said insulation means, said covering means including a bottom portion having a surface which is substantially consistent with said motor vehicle interior for aesthetic purposes and the like, wherein said sheet of support material includes a relatively resilient material capable of flexing and includes apparatus for removably attaching said insert apparatus near the periphery of said window, said insert apparatus being attached beneath said window pane.

2. The window insert of claim 1 wherein said insulation means, said support material, and said means for covering are combined in a single sheet of material.

3. The window insert of claim 1 wherein said sheet of support material includes a mirror-like reflecting top surface for reflecting substantially all sunlight and heat impinging upon said top window.

4. The window insert apparatus of claim 1 wherein said insulation means is operatively disposed beneath said sheet of support material.

5. The window insert apparatus of claim 1 wherein said top window pane of said motor vehicle is adapted to be removed, tilted open, respositioned and the like, said window pane and said cover means including an apparatus for coupling said insulated window insert in a position generally near an interior of said window.

6. An insulated window covering apparatus for use in a motor vehicle having at least one window in the roof thereof, said at least one window including a window pane and a holder for said window pane, comprising:

a relatively thin insulation means adapted to be removably positioned beneath said at least one roof window for blocking substantially all sunlight from entering an interior of said motor vehicle through said at least one window, said insulation means for insulating an interior of said motor vehicle from temperature conditions external to said motor vehicle, said insulation means including covering means with an interior-facing surface means for providing a color and a texture consistent with said motor vehicle interior; and selectively operable fastening means for quickly and easily attaching said insulated window covering beneath said window opening pane without opening said at least one window pane or leaving the motor vehicle.

* * * * *